United States Patent
Tolnai et al.

[15] 3,693,663
[45] Sept. 26, 1972

[54] MIXING VALVE

[72] Inventors: Julius L. Tolnai, Los Angeles; Patsy B. Palmer, Granada Hills, both of Calif.

[73] Assignee: Price-Pfister Brass Mfg., Co., Pacoima, Calif.

[22] Filed: Nov. 27, 1970

[21] Appl. No.: 93,225

[52] U.S. Cl. ............137/636.1, 137/636.4, 137/607
[51] Int. Cl. ......................F16k 11/14, F16k 19/00
[58] Field of Search.....137/630.2, 635, 636.1, 636.3, 137/636.4, 607; 251/257

[56] References Cited

UNITED STATES PATENTS 3,586,053   6/1971   Browning ...............137/636.4

FOREIGN PATENTS OR APPLICATIONS 357,933   12/1961   Switzerland ...............137/607

*Primary Examiner*—Robert G. Nilson
*Attorney*—Flam and Flam

[57] ABSTRACT

A mixing valve having a valve post wherein a pair of fluid supply channels terminate at respective laterally facing orifices. A flexible sealing flap overlies each orifice. A post encircling valve sleeve includes an interior cam surface which presses the sealing flaps against the orifices for selective blocking or opening thereof depending on the axial and angular position of the sleeve. Fluid emergent from the orifices flows through a mixing chamber between the post and sleeve to a return port in the post.

12 Claims, 10 Drawing Figures

PATENTED SEP 26 1972
3,693,663
SHEET 1 OF 3
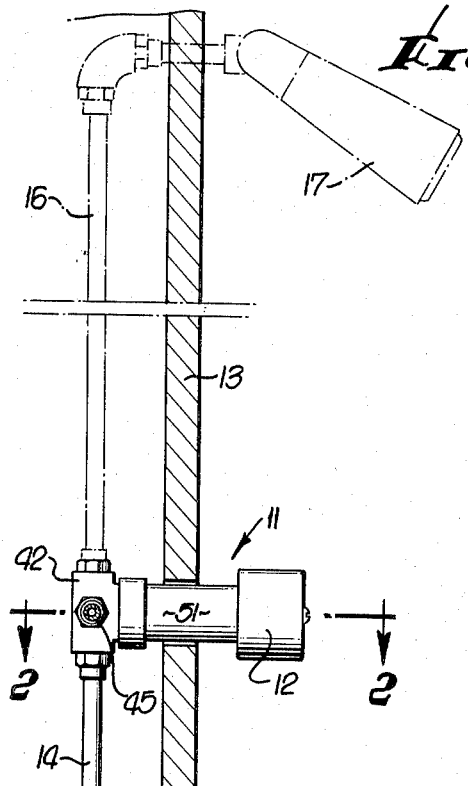
FIG. 1.
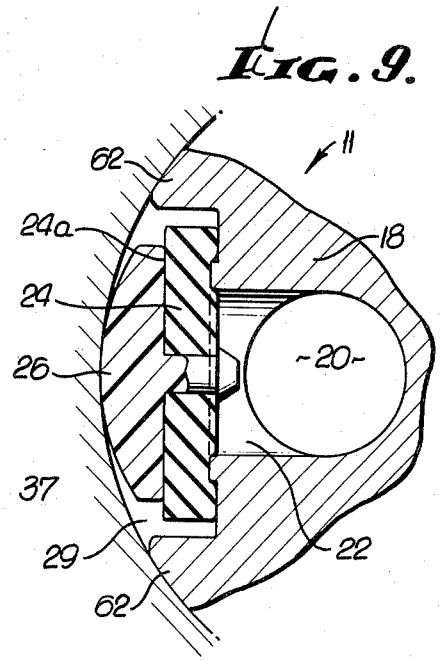
FIG. 9.
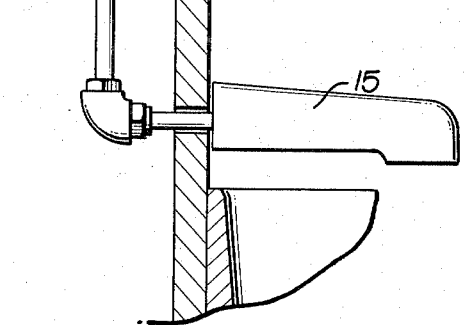
FIG. 10.
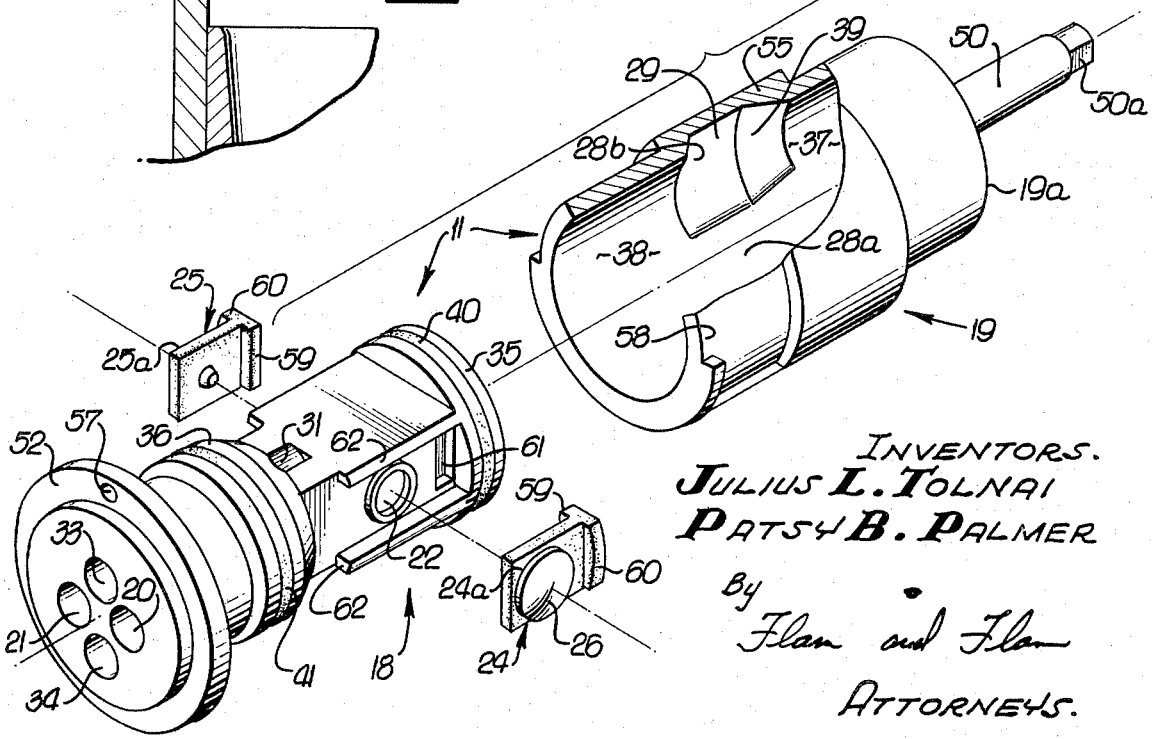
INVENTORS.
JULIUS L. TOLNAI
PATSY B. PALMER
By Flam and Flam
ATTORNEYS.

INVENTORS.
JULIUS L. TOLNAI
PATSY B. PALMER
BY Flam and Flam
ATTORNEYS.

INVENTORS.
JULIUS L. TOLNAI
PATSY B. PALMER

By
Flam and Flam
ATTORNEYS.

MIXING VALVE

BACKGROUND OF THE INVENTION

1. Field of the Invention

The present invention relates to a mixing valve facilitating single handle control of fluid mixture and flow volume, and particularly to such a mixing valve including deformable fluid supply port seals responsive to a circumferentially cammed control member.

2. Description of the Prior Art

In recent years, faucets having a single handle to control both water temperature and flow volume have gained widespread acceptance. Typically, such faucets utilize a mixing valve in which linear motion of a valve element turns the water on and off, while rotation of the element controls the relative proportion of hot and cold water.

In the past, various mixing valve designs have been suggested wherein a pair of fluid supply ports are situated in a stationary valve spool or post. Telescopically encircling the post is a valve sleeve having sets of holes therethrough. A housing surrounds both post and sleeve. In operation, the sleeve is rotated to bring the holes into greater or lesser registry with the fluid supply ports. Hot and cold water flow through the overlapping portions of the sleeve holes into a mixing space within the valve housing, whence the fluid is discharged through a spout or other outlet port. Fluid volume is controlled by axial motion of the sleeve to increase or decrease simultaneously the hole-port overlap at both fluid inlets.

Various problems are encountered in post-sleeve mixing valves of the type just described. Most significant is that since the valve housing forms a wall of the mixing chamber, this housing must be watertight to prevent leakage. This necessitates, for example, the incorporation of seals or bushings to prevent leakage around the shaft projecting through the housing between the sleeve and the control handle. In such valves, the possibility also exists for leakage into the wall or other surface to which the valve is attached.

These and other shortcomings of the prior art are overcome by the inventive valve wherein mixing takes place in a chamber between the sleeve and post, using cam-responsive fluid supply port seals. Since fluid flow is constrained within the sleeve, the housing need not be watertight, substantially simplifying construction of the valve. Should valve leakage occur, fluid of necessity would flow to the output port and not into the wall supporting the valve.

SUMMARY OF THE INVENTION

In accordance with the present invention, there is provided a mixing valve which may be used advantageously for single handle control of both fluid mixture and flow volume.

In a preferred embodiment, the mixing valve comprises a valve post having a pair of interior channels for supplying fluid to respective first and second laterally opening supply ports, and having one or more additional interior channels for returning fluid from a return port in the post. A deformable sealing flap overlies the orifice of each supply port. Telescopically encircling the post is a valve sleeve including an interior cam surface which presses the sealing flaps against the orifices selectively to block or open the supply ports depending on the axial and angular position of the sleeve. Fluid emergent from the orifices flows through a mixing space between the post and sleeve to the return port.

The valve sleeve is provided with a skirt portion which cooperates with a circular flange on the post to prevent leakage from the mixing space regardless of the sleeve axial position. A decorative housing surrounds the post and sleeve; the housing need not be watertight since fluid flow is completely confined within the sleeve.

Thus an object of the present invention is to provide a mixing valve in which fluid flow is controlled by the cooperation of deformable sealing flaps overlapping the fluid supply ports and responsive to an encircling cam member.

Another object of the present invention is to provide a mixing valve including a valve post having a pair of orifice terminating fluid supply channels and at least one fluid return channel, a sealing flap covering each supply orifice, and a post encircling valve sleeve having an interior cam surface engaging the sealing flaps to open or close the supply orifices in response to axial or angular motion of the sleeve.

A further object of the present invention is to provide an improved post and sleeve-type mixing valve wherein fluid flow is constrained entirely within the sleeve.

BRIEF DESCRIPTION OF THE DRAWINGS

Detailed description of the invention will be made with reference to the accompanying drawings wherein like numerals designate like parts in the several figures. These drawings, unless described as diagrammatic or otherwise indicated, are to scale.

FIG. 1 is a side elevation view, partly in section, of a typical shower and bathtub installation incorporating the inventive mixing valve for single handle control of water temperature and flow volume.

FIG. 9 is an enlarged, fragmentary sectional view of an inlet port and associated sealing flap, viewed in the same aspect as FIG. 4.

FIG. 10 is an enlarged isometric view of the valve post, sealing flaps and valve sleeve components of the inventive mixing valve, the sleeve being shown partly cut away and in section.

DESCRIPTION OF THE PREFERRED EMBODIMENTS

Figure 2:
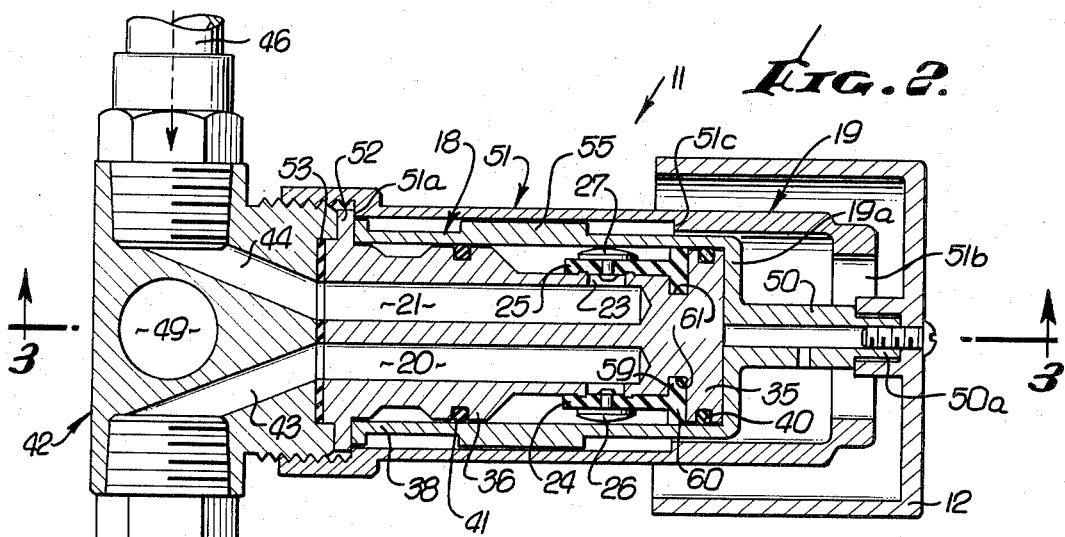
FIG. 2 is a transverse sectional view of the inventive mixing valve as seen along the line 2—2 of FIG. 1; the valve is shown in the off or flow-preventing position.
Figure 4:
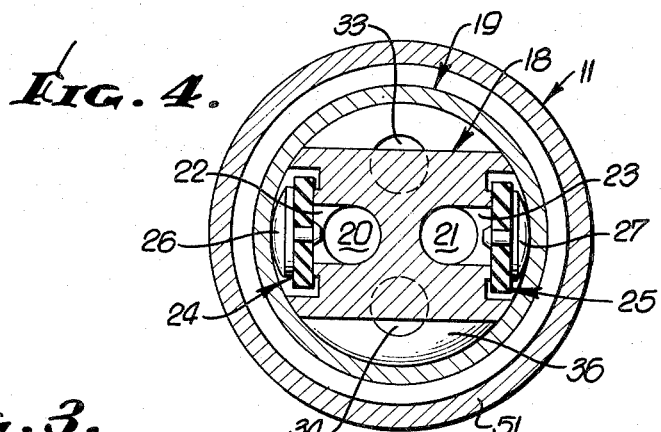
FIG. 4 is a transverse sectional view of the mixing valve as seen along the line 4—4 of FIG. 3; as in FIGS. 2 and 3, the valve sleeve is situated in the flow-preventing position.

The following detailed description is of the best presently contemplated modes of carrying out the invention. This description is not to be taken in a limiting sense but is made merely for the purpose of illustrating the general principles of the invention since the scope of the invention best is defined by the appended claims.

Structural and operational characteristics attributed to forms of the invention first described also shall be attributed to forms later described unless such characteristics obviously are inapplicable or unless specific exception is made.

Referring now to the drawings, and particularly to FIG. 1 thereof, there is shown a typical bathroom plumbing installation incorporating a mixing valve 11 in accordance with the present invention. Valve 11 has a single handle 12 and is mounted through a bathroom wall 13. Linear movement of handle 12 away from or toward wall 13 controls the volume of water supplied via a pipe 14 to a bathtub spout 15 or optionally, via a pipe 16 to a shower head 17. Rotation of handle 12 controls water temperature by determining the relative proportion of hot and cold water mixed by valve 11.

As seen in FIGS. 2, 3, 5 and 10, valve 11 comprises a valve post 18 telescopically encircled by a valve sleeve 19 connected to handle 12. Fluid enters post 18 through inlet channels 20, 21 which terminate respectively at laterally facing supply ports or orifices 22, 23 each overlapped by a sealing flap 24, 25. Flaps 24, 25, which may be provided with respective rigid buttons 26, 27 on the exterior surfaces 24a, 25a thereof, are released from or forced against (FIG. 9) respective orifices 22, 23 by engagement with an interior cam surface 28 in sleeve 19.

Fluid emergent from an open orifice 22 or 23 (FIG. 5) flows through a mixing chamber 29 between post 18 and sleeve 19 and exits valve 11 via return ports 31, 32 and associated return channels 33, 34 through post 18. The ends of mixing chamber 29 are defined by circular flanges 35, 36 on post 18, which engage the cylindrical interior regions 37, 38 of sleeve 19 on either side of cam surface 28. As described below, fluid mixture and flow volume are determined respectively by the axial and angular position of sleeve 19, this position establishing the extent to which each of supply ports 22, 23 is blocked by the respective cam-responsive sealing flap 24, 25.

When valve 11 is turned off, as shown in FIGS. 2, 3, 4 and 9, the cylindrical interior region 37 of valve sleeve 19 presses against both buttons 26, 27 thereby forcing flaps 24, 25 into sealing relationship with respective supply ports or orifices 22, 23. As a result, fluid supplied via channels 20, 21 will be prevented from entering mixing chamber 29, and no fluid will emerge from valve 11.

Figure 6:
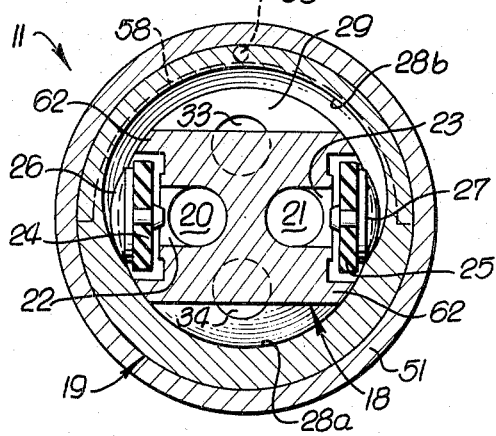
FIGS. 6, 7 and 8 are transverse sectional views, all as seen along the line 6—6 of FIG. 5, showing different mixing positions of the inventive valve.
Figure 8:
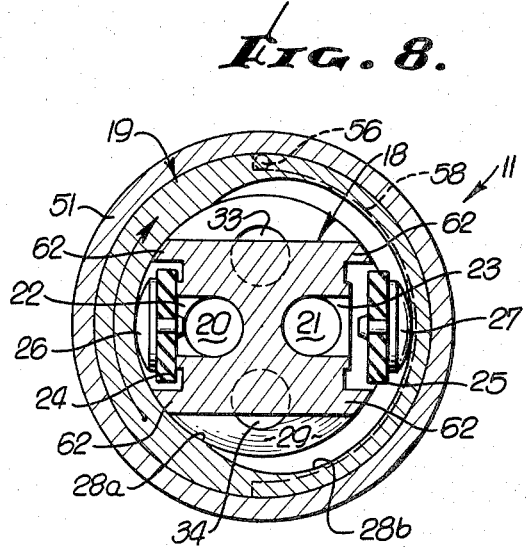
Figure 7:
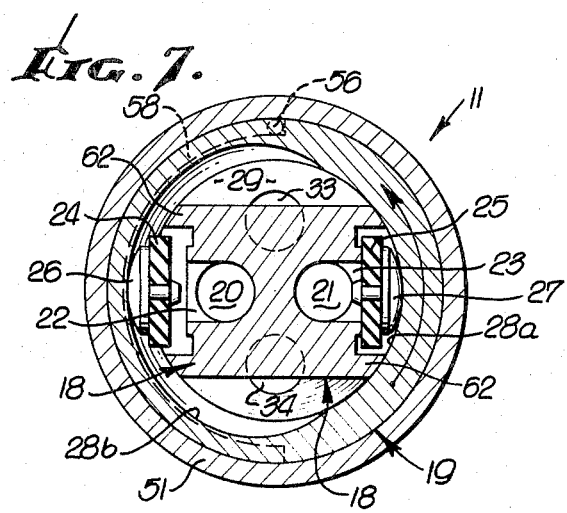

To facilitate fluid mixture control, valve sleeve interior cam surface 28 is circumferentially eccentric, as evident in FIGS. 6, 7 and 8, including a portion 28a which is substantially circular and flush with cylindrical interior surface 37 and an eccentric region 28b of generally greater radius than portion 28a.

As handle 12 and valve sleeve 19 are rotated, cam surface 28 differentially presses one or the other of buttons 26, 27 and sealing flaps 24, 25 against respective supply ports 22, 23. The relative closure of these ports determines the proportion of fluid entering mixing chamber 29 from each of channels 20, 21. For example, in FIG. 6, sleeve 19 is oriented so that ports 22, 23 are equally open. Like amounts of fluid thus will flow through orifices 22, 23 and around sealing flaps 24, 25 into mixing chamber 29. As indicated by the solid arrows in FIG. 5, fluid from mixing chamber 29 flows through return ports 31, 32 and return channels 33, 34 out of valve 11.

If handle 12 and sleeve 19 are turned to the extreme counter-clockwise position shown in FIG. 7, cam surface portion 28a presses sealing flap 25 against orifice 23, thereby preventing fluid flow from channel 21 into mixing chamber 29. However, cam surface region 28b does not close sealing flap 24, thereby permitting fluid to flow from orifice 22 past flap 24 into mixing chamber 29. The output from valve 11 will comprise only fluid, e.g., hot water, supplied via channel 20.

FIG. 8 shows sleeve 19 oriented so that cam surface 28 closes orifice 22 but permits orifice 23 to remain open. Accordingly, only fluid entrant via supply channel 21 will flow into mixing chamber 29 and thence out of valve 11 via return ports 31, 32 and return channels 33, 34. At angular positions of sleeve 19 intermediate those shown in FIGS. 6 and 7, there will be relatively greater proportion of fluid flow from supply port 22 than from supply port 23. Alternatively, at sleeve 19 angular positions intermediate those shown in FIGS. 6 and 8, more fluid from supply ports 23 will be passed than from supply port 22.

Figure 5:
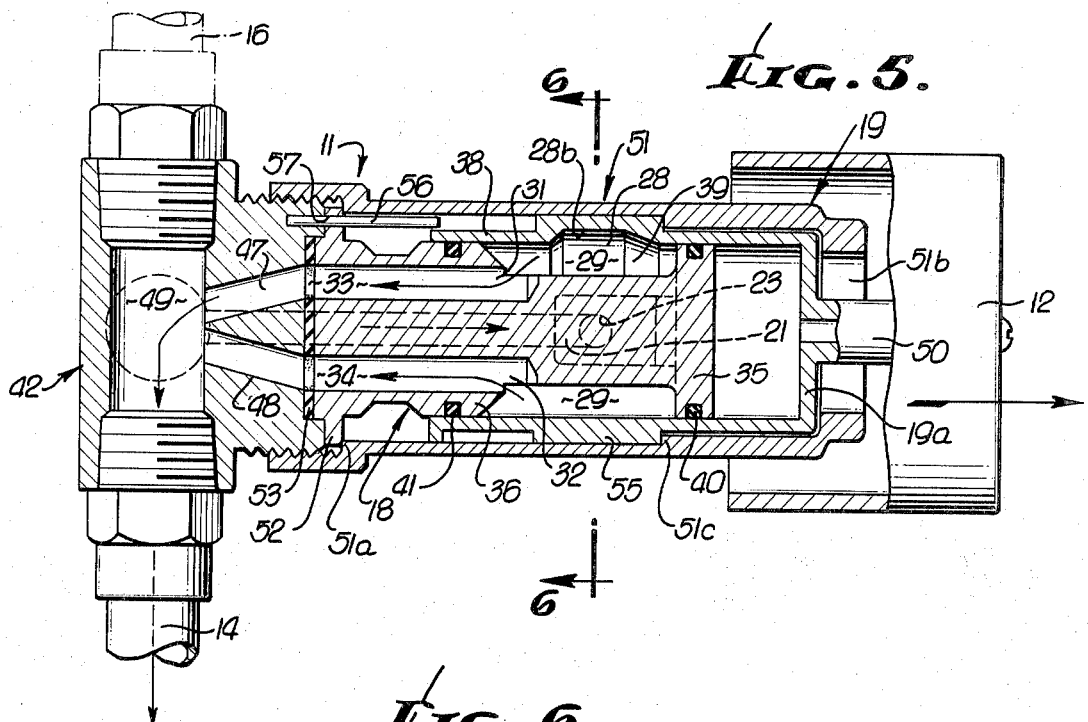
FIG. 5 is a transverse sectional view of the inventive mixing valve, viewed in the same aspect as FIG. 3, but with the valve sleeve situated in a flow-permitting position.

As best evident in FIGS. 5 and 10, a portion 39 of cam surface 28 is tapered axially between the maximum cam radii and the lesser radius of interiorly cylindrical region 37. Tapered region 39 functions to press both of sealing flaps 24, 25 toward respective orifices 22, 23 as handle 12 and sleeve 19 are pushed toward the off position. Thus, tapered region 39 facilitates control of flow volume, independent of mixture, in response to axial displacement of sleeve 19.

Leakage from chamber 29 is prevented by the use of O-rings 40, 41 between flanges 35, 36 and the interior of sleeve 19. Note that cylindrical region 38 forms a skirt which extends beyond circular flange 36 when valve 11 is in the off or flow-preventing position shown in FIGS. 3 and 4. This insures that when handle 12 and valve sleeve 19 are pulled to the flow-permitting position illustrated in FIG. 5, the interior of skirt 38 still will engage flange 36 and O-ring 41 to maintain the leakproof integrity of mixing chamber 29.

Referring now to FIGS. 2, 3, 5 and 10, valve base 42 provides connection via bores 43, 44 between fluid supply channels 20, 21 and respective hot and cold water lines 45, 46. Further, return channels 33, 34 communicate with outlet pipes 14 and 16 via bores 47, 48 and an outlet chamber 49 in base 42. Note also that handle 12 is screw attached to the flattened end 50a of an integral shaft 50 projecting from the one closed end 19a of valve sleeve 19.

Figure 3:
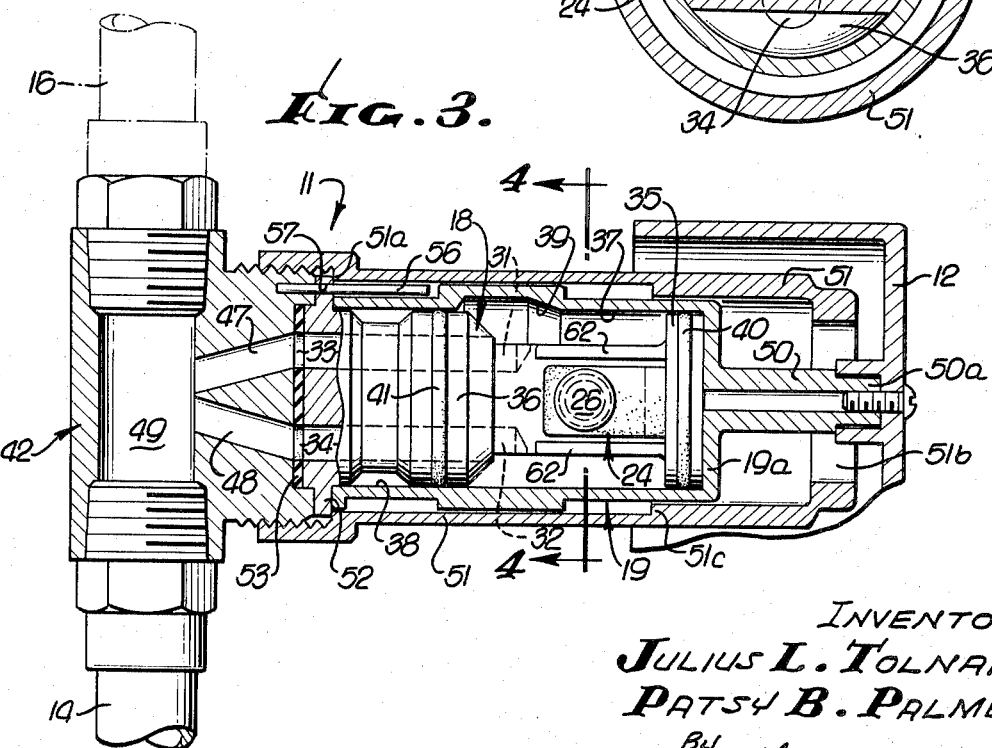
FIG. 3 is a transverse sectional view of the mixing valve of FIG. 2, as seen along the line 3—3 thereof, but with a portion of the valve post shown in top elevation.

Referring to FIGS. 2, 3 and 5, note that post 18 and sleeve 19 are surrounded by a housing 51 threadingly attached to base 42. A circumferential flange 52 on post 18 is clamped beneath a shoulder 51a in housing 51 to attach post 18 and a gasket 53 to base 42. Since fluid flow is constrained completely to within valve sleeve 19, there is no requirement that housing 51 be watertight, and in fact, the end of housing 51 is provided with a relatively large opening 51b through which shaft 50 projects.

The interior of housing 51 also includes a shoulder 51c which cooperates with an exterior peripheral flange 55 on sleeve 19 to limit linear travel of sleeve 19 away from base 42. Angular travel of sleeve 19 is limited by a stop pin 56 (FIGS. 3 and 5) mounted through a hole 57 in post flange 52 and projecting into a peripheral keyport 58 on the outside of sleeve 19. FIGS. 7 and 8 illustrate the rotation limiting cooperation of stop pin 56 and keyport 58.

Referring to FIG. 10, note that each of sealing flaps 24, 25 comprises a flexible membrane, typically plastic or rubber, of generally rectangular shape, and having transverse tabs 59, 60 at one end thereof. Tabs 59 seat within recesses 61 in valve post 18, and tabs 60 cooperate with cylindrical sleeve surface 37 to prevent flaps 24, 25 from becoming disengaged from post 18. Shoulders 62 extending laterally from valve post 18 limit transverse motion of flaps 24, 25.

Note that if leakage should occur around sealing flaps 24, 25 when sleeve 19 is in the flow-preventing position, the leaking fluid would enter mixing chamber 29 and flow out through return ports 31, 32. Skirt 38 and O-ring 41 prevent leakage to housing 51 and wall 13.

In alternative embodiments of the invention (not shown), buttons 26, 27 may be dispensed with, and the interior surface of sleeve 37 may press directly against the deformable membrane of flaps 24, 25. In another embodiment, the sealing flaps may be dispensed with entirely, and orifices 22, 23 may extend outwardly to the radius of interior cylindrical surface 37. In this instance, surface 37 itself may serve to block fluid flow through the supply ports. Alternatively, the interior surface of sleeve 19 may be provided with a resilient plastic or rubber coating, or a sleeve of rubber or plastic may be inserted between post 18 and sleeve 19. In any event, circumferentially eccentric cam surface 28 cooperates with orifices 22, 23 to permit selective, differential control of fluid flow from supply ports 20, 21 through mixing valve 11.

We claim:

1. In a mixing valve:
a relatively stationary first valve member,
first and second orifice terminating fluid supply channels through said first valve member,
first and second deformable membrane sealing flaps overlapping said orifices,
a second valve member positionable axially and rotationally with respect to said first valve member and having an internal eccentric surface portion for cam-engagingly deforming said membrane sealing flaps against said orifices selectively to block or open said orifices depending on the position of said second valve member,
a fluid mixing region between said first and second valve members for receiving fluid emergent from said open orifice or orifices, said internal eccentric surface portion forming a wall of said mixing region, and
a fluid outlet in said first valve member and communicating with said mixing region.

2. A mixing valve comprising:
a valve post,
first and second orifice terminating fluid supply channels through said post,
sealing flap means covering each orifice, and
a post encircling valve sleeve having a circumferentially eccentric interior surface portion cam-engaging said flap means differentially to seal or open said orifices in response to sleeve rotation, said eccentric portion axially tapering into an adjacent interiorly cylindrical sleeve portion, axial motion of said valve sleeve causing sealing or opening of both orifices by cam-engagement of said taper with said flap-means,
a mixing chamber between said post and sleeve, said orifices opening into said chamber, and
a fluid return port through said post and opening into said chamber.

3. A mixing valve as defined in claim 2 wherein said sleeve also includes an interiorly cylindrical skirt separated by said eccentric portion from said adjacent cylindrical sleeve portion, and wherein said post comprises spaced first and second circular peripheral flanges respectively engaging said skirt and said adjacent cylindrical sleeve portion and defining the ends of said mixing chamber.

4. A mixing valve as defined in claim 3 further comprising O-ring means between said circular flanges and said sleeve for preventing leakage from said mixing chamber, and a non-leakproof housing surrounding said post and sleeve.

5. A mixing valve as defined in claim 4 wherein said orifices open laterally of said post between said circular flanges, and wherein each of said sealing flap means comprises a deformable membrane larger in size than said orifice and a rigid button attached to the surface of said membrane facing said sleeve.

6. A mixing valve as defined in claim 5 further comprising means for maintaining said deformable membranes in overlapping relationship with said orifice.

7. A mixing valve comprising:
a valve post having first and second interior channels for supplying fluid to respective first and second laterally opening supply ports, and having another interior channel for returning fluid from a return port,
a deformable sealing flap overlapping each of said supply ports,
a valve sleeve telescopically encircling said post and including an interior cammed surface for selectively opening or blocking said supply ports depending on the radial and axial position of said sleeve, fluid emergent from an open supply port or ports flowing through a mixing space between said post and said sleeve to said return port, said cammed surface selectively pressing said flaps against said ports to block fluid flow into said mixing space.

8. A mixing valve as defined in claim 7 wherein said post includes first and second spaced circular flanges, and wherein said valve sleeve includes first and second interiorly cylindrical regions separated by said cammed surface, said cylindrical regions being supported by said flanges.

9. A mixing valve as defined in claim 8 wherein said supply ports and return port all are situated between said flanges, said flanges forming leakproof seals with said cylindrical regions and defining the ends of said mixing space.

10. A mixing valve as defined in claim 9 further comprising a non-leakproof housing surrounding said post and sleeve.

11. A mixing valve as defined in claim 7 wherein each flap has a first surface facing said sleeve, and further comprising a rigid button of diameter greater than said supply port attached to said first surface of each flap, said cammed surface engaging said button to press said flap against said port.

12. In a mixing valve:
a valve post,
first and second orifice terminating fluid supply channels through said post,
for each orifice, a sealing flap anchored only at one end to said post, a portion of said flap spaced from said one end overlying the orifice, and
a post encircling valve sleeve having a circumferentially eccentric interior surface portion cam-engaging said flaps differentially to seal or open said orifices in response to sleeve rotation, each flap being substantially unstretched when in sealing relationship with the respective orifice.

* * * * *